United States Patent [19]

May

[11] Patent Number: 5,195,718
[45] Date of Patent: Mar. 23, 1993

[54] SPRINKLER VALVE

[76] Inventor: Gordon H. May, 3261 Woodleigh La., Cameron Park, Calif. 95682

[21] Appl. No.: 762,565

[22] Filed: Sep. 18, 1991

[51] Int. Cl.5 .................... F16K 31/02; F16K 31/126
[52] U.S. Cl. .................................. 251/30.02; 251/34
[58] Field of Search ............... 251/30.01, 30.02, 30.05, 251/129.03, 33, 34

[56] References Cited

U.S. PATENT DOCUMENTS

| | | | |
|---|---|---|---|
| 833,307 | 10/1906 | Dake | 251/30.05 X |
| 3,090,592 | 5/1963 | Fleer | 251/30.02 X |
| 4,108,419 | 8/1978 | Sturman et al. | 251/30.05 |
| 4,640,093 | 2/1987 | Eastman | 251/30.02 X |
| 4,981,280 | 1/1991 | Brandenberg | 251/30.02 X |
| 5,011,081 | 4/1991 | Bentley | 251/30.02 X |

FOREIGN PATENT DOCUMENTS 2066422 7/1981 United Kingdom ......... 251/30.05 X

Primary Examiner—Martin P. Schwadron
Assistant Examiner—Kevin L. Lee
Attorney, Agent, or Firm—Peter Peckarsky

[57] ABSTRACT

A sprinkler valve suitable for flows from about one (1) to two (2) gallons per hour to thirty (30) to forty (40) gallons per minute. A double diaphragm utilizes a principle of differential areas to create force for any non-zero pressure through the valve. This feature, in conjunction with momentary fluid flow in the solenoid circuit, is responsible for complete regulation of the flow characteristics of the valve. The requirement for large shut-off springs and flow control adjustment screws has been eliminated.

14 Claims, 4 Drawing Sheets

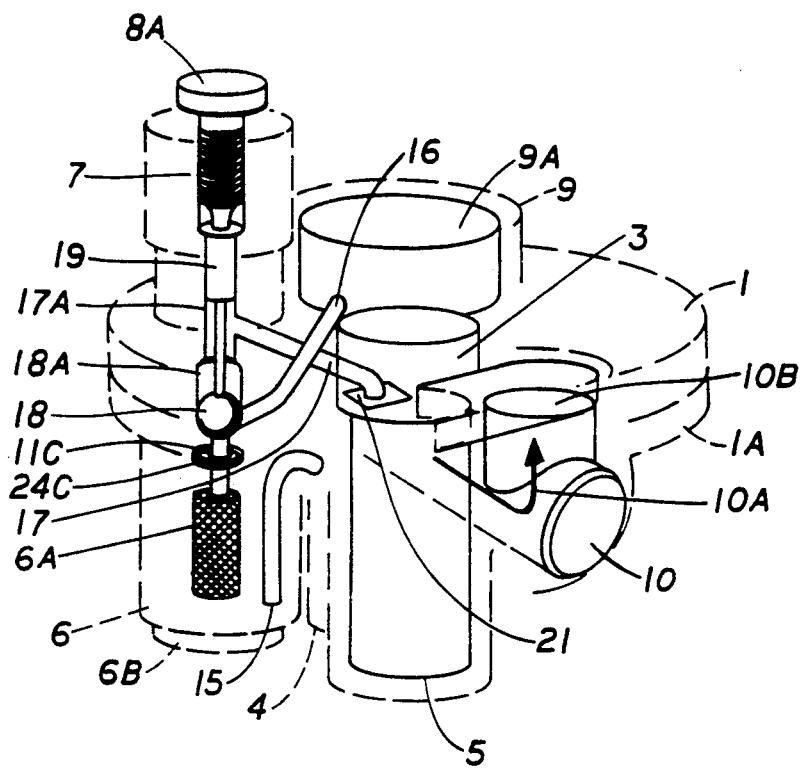
FIG. 3
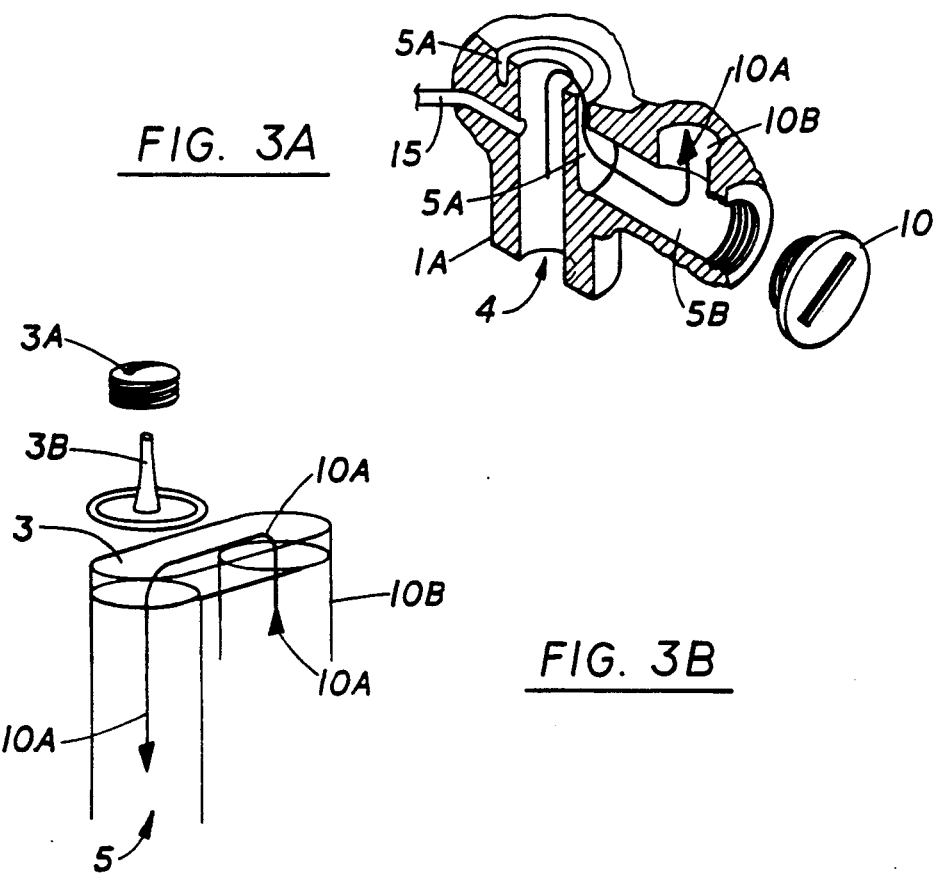
FIG. 3A
FIG. 3B

SPRINKLER VALVE

FIELD OF THE INVENTION

Generically, the invention relates to controlling any fluid flow (liquid or gas) in low flow rate systems used to distribute fluids. The specific embodiment of the invention discussed in the specification relates to applications for control valves to be used for watering plants, lawns, trees, and low flow drip irrigation systems.

BACKGROUND OF THE INVENTION

Because of requirements for water conservation, low flow drip systems have become an important means of watering plants and the like. These drip systems, along with home use applications, require flow rates down to one (1) or two (2) gallons per hour. Present 0.75 inch inlet port sprinkler valves are suitable for flow rates from five (5) gallons per minute up to thirty (30) to forty (40) gallons per minute. These present valves require flow control adjustment means, large compression shut-off springs, and solenoid return springs. The prior art devices balance fluid pressure on a single diaphragm against a variable spring force.

The prior art diaphragm closing springs and solenoid springs must be of sufficient strength to offset normal internal valve fluid pressures of 40 psi to 150 psi.

Further, fluid flows in the prior art solenoid circuits whenever the valve is in the "ON" state. This continual flow of fluid in the small orifices and passages of the prior art solenoid circuits may cause a problem if there is sediment in the fluid.

SUMMARY OF THE INVENTION

It is the purpose of this invention which operates without flow control adjusting screws, valve shut-off compression springs, and solenoid return springs to provide means to self-regulate fluid flows down to about one (1) gallon per hour and up to a maximum flow rate limited only by the size of the valve.

The invention provides for a differential force to keep the sprinkler valve closed which force is provided by the difference in areas between an upper diaphragm and a lower diaphragm. For a constant pressure differential between the upper and lower diaphragms of the invention, a constant force is produced.

The sprinkler valve of the invention described in this specification does not require springs to offset fluid pressures in the range of 40 psi to 150 psi.

Further, another purpose of this invention is to eliminate clogging of the small passages and orifices in the solenoid circuit. This unique improvement of eliminating clogging of the small passages and orifices in the solenoid circuit is accomplished since fluid flow in the solenoid circuit is momentary and only occurs during the shift from an "OFF" state to an "ON" state. In a sprinkler valve using the invention, the shift from an "OFF" state to an "ON" state may be accomplished either manually or by applying electrical current to the solenoid.

These and further operational and construction characteristics of the invention will be more evident from the detailed description given hereinafter with reference to the figures of the accompanying drawings which illustrate one preferred embodiment by way of non-limiting examples.

BRIEF DESCRIPTION OF THE DRAWINGS

FIG. 3 shows a perspective view of the sprinkler valve showing some of the internal passages.

FIG. 3A shows a cutaway view of some of the fluid flow passages.

FIG. 3B shows a cutaway view of some additional fluid passages.

DESCRIPTION OF THE PREFERRED EMBODIMENT

Figure 1:
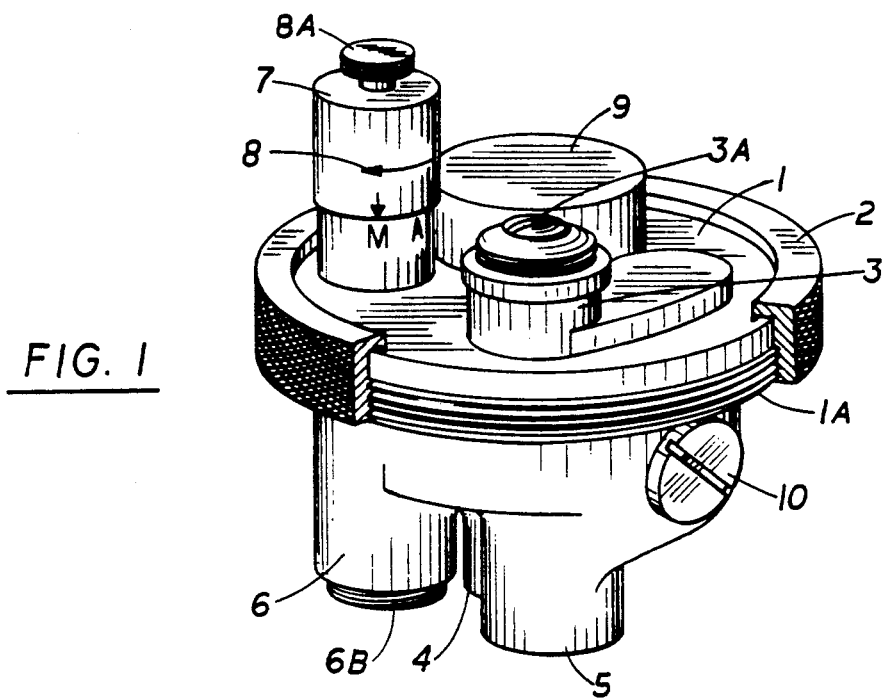
FIG. 1 shows a perspective view of the sprinkler valve.

FIG. 1 shows a perspective view of a sprinkler valve. This embodiment, though not limited in size or shape, shows an upper body shell 1, a lower body shell 1A, and a screw-on clamp ring 2 which clamps the upper body shell 1 to the lower body shell 1A. Appropriate "O" rings or sealing means are employed to insure fluid flows are contained in their respective channels. A well-known anti-siphon valve chamber 3 can, if not required, be fitted with a cap 3A. Said cap 3A eliminates the anti-siphon feature without requiring a separate housing as used on prior sprinkler valve designs (i.e., if desired, the anti-siphon valve may be eliminated from the sprinkler valve and the passage to the cavity for the anti-siphon valve is sealed with cap 3A). An inlet port 4 is shown in FIG. 1. The inlet port is attached to a fluid source. Similarly, FIG. 1 shows an outlet port 5. The outlet port 5 is attached to the device or devices which use the fluid whose flow to the device or devices is controlled by the sprinkler valve. FIG. 1 shows a sediment sump 6 and sediment sump drain plug 6B. FIG. 1 also shows an electrically operated solenoid 7. The sediment sump is used to prevent sediment from accumulating in the solenoid circuit. FIG. 1 also shows a well-known manual flow control 8A. FIG. 1 shows that the solenoid 7 may be rotated clockwise in the direction of the arrow 8 from the automatic position (indicated by the letter "A" on the side of said solenoid 7) to the manual position (indicated by the letter "M" on the side of manual control 8A). This rotation of the solenoid would eliminate the need for the manual screw 8A. When the solenoid is in the manual position ("M") the valve is locked in the "ON" state and water always flows from inlet port 4 to outlet port 5 regardless of whether electrical current is applied to the solenoid. When the solenoid is in the automatic position ("A") the valve is in the "ON" state only when electrical current is applied to the solenoid. FIG. 1 shows the top of a diaphragm chamber 9 which top is a part of the upper body 1. FIG. 1 also shows a port plug 10.

In the embodiment shown in FIG. 1, for normal function there is no requirement for a solenoid plunger spring because fluid pressure accomplishes the function of keeping the sprinkler valve in the "OFF" state in which no fluid is flowing out of outlet port 5.

Figure 2:
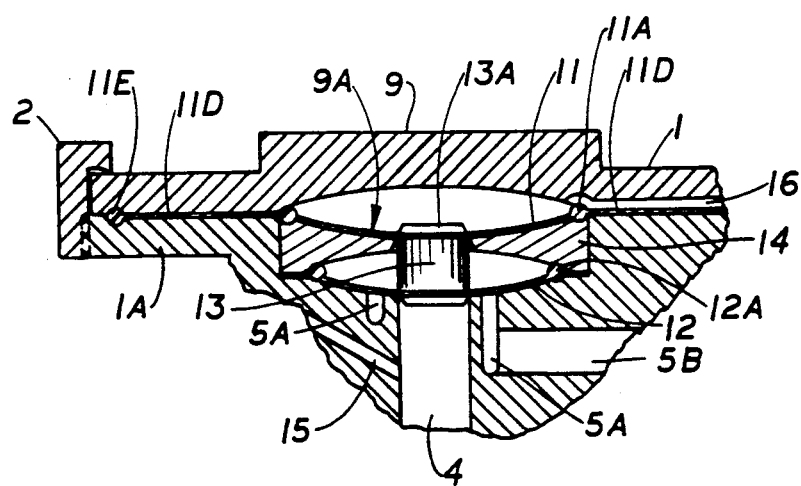
FIG. 2 shows a cross-sectional view of the sprinkler valve showing the diaphragm assembly.

FIG. 2 shows upper body lower body 1A, and screw-on clamp ring 2 which clamps the upper body 1 to the lower body 1A.

FIG. 2 also shows a typical low cost double diaphragm assembly 9A which fits inside of diaphragm assembly chamber 9. In FIG. 2, diaphragm 11 in the embodiment shown is also a portion of a seal or gasket 11D between the upper body 1 and the lower body 1A of FIG. 1. As shown in FIG. 2, gasket 11D (containing diaphragm 11) is molded with rigid spool 13, stop 13A, and lower diaphragm 12. The double diaphragm assembly consists of circular support ring 14, spool 13, stop 13A circular diaphragm 11 and circular diaphragm 12. Spool 13 and stop 13A are integrally molded with circular diaphragms 11 and 12. The diameter of diaphragm 11 is greater than the diameter of diaphragm 12.

The diaphragm assembly 9A is molded as shown cupped downward (center lower than circumference) to bias this assembly in a normally closed position (i.e., with inlet port 4 closed). Because the assembly is biased in the closed position low pressure leakage in the main circuit from inlet port 4 to outlet port 5 is avoided.

Circular support ring 14 supports and secures diaphragms 11 and 12 (i.e., assembly 9A) as they are positioned in the valve assembly. For ease of manufacture and assembly, circular support ring 14 may be made in the form of two mating halves. Beads 11A and 12A prevent the diaphragms 11 and 12, respectively, from pulling away from the ring 14. Stop 13A prevents the diaphragm from obstructing fluid flow in and out of passage 16. Stop 13A is molded as part of the diaphragm design.

FIG. 2 also shows inlet port 4 and annular passage 5A which connects inlet port 4 to fluid passage 5B.

With reference to FIG. 2, when the sprinkler valve is open (or in the "ON" state), fluid from inlet port 4 moves into an annular passage 5A and down to fluid passage 5B. Annular passage 5A is deep where it meets passage 5B and is as shallow as necessary to allow channel 15 to pass, from inlet port 4 under passage 5A to sediment sump 6.

Because a differential diaphragm assembly is employed in a sprinkler valve constructed according to the invention described in this specification, there is no need with the invention described in this specification for a spring to close the valve.

FIG. 3 shows a perspective view of some of the internal passages and solenoid parts of the sprinkler valve.

FIG. 3 shows upper body 1, lower body 1A, anti-siphon valve chamber 3, inlet port 4, outlet port 5, sediment sump 6, sediment strainer 6A, sediment sump drain plug 6B, and an electrically operated solenoid 7 with a well-known manual control 8A attached to the top of solenoid 7. FIG. 3 also shows diaphragm assembly 9A inside diaphragm assembly chamber 9.

Through the use of well-known molding techniques, lower body 1A of FIG. 3 may be manufactured without port plug 10. As shown, however, port plug 10 is used to direct fluid flow in the direction of arrow 10A to the vertical passage 10B (the fluid flow from inlet port 4 to outlet port 5 is discussed below with reference to FIG. 3A and FIG. 3B).

FIG. 3 shows passage 15 which carries fluid from inlet port 4 to sediment sump 6. (Passage 15 could also connect inlet port 4 directly to any point in the ball chamber below the lowest possible position of the bottom of the ball.) Fluid flows from sediment sump 6 into ball chamber 18A through hole 11C in gasket 11D (of FIG. 2) which hole 11C (in this embodiment) is at the bottom of ball chamber 18A. Ball 18 is shown in ball chamber 18A. Sealing bead 24C circumferentially seals hole. 11C. Passage 16 carries fluid from ball chamber 18A to the top of diaphragm assembly chamber 9. Passage 17 carries fluid from narrow upper portion 17A of the ball chamber 18A to the outlet port 5. Sealing bead 24C prevents fluid leakage between upper body 1 and lower body 1A. The electrically controlled solenoid plunger 19 pushes ball 18 down to prevent fluid from entering chamber 18A from passage 15. Flapper valve 21 is molded into a three-sided flap which performs as a one-way flapper valve to prevent fluid from backing up from outlet port 5 into passage 17.

FIG. 3A shows fluid flows from inlet port 4 to annular passage 5A to passage 5B and then into passage 10B (the fluid flow out of passage 10B is shown in FIG. 3B). Port plug 10 functions to direct the fluid flow in the direction of arrow 10A from passage 5B into passage 10B. FIG. 3A also shows that fluid flows from inlet port into passage 15.

FIG. 3B shows that fluid flows in the direction of arrow 10A from passage 10B through anti-siphon chamber and into outlet port 5. FIG. 3B also shows anti-siphon valve chamber cap 3A and well-known anti-siphon valve 3B.

Figure 4:
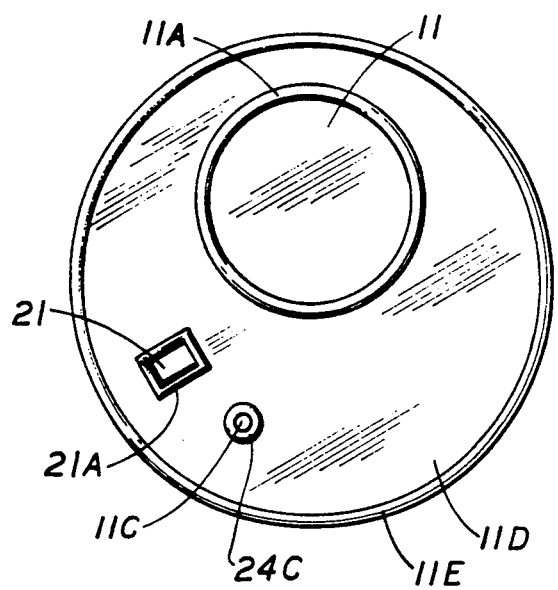
FIG. 4 shows a molded diaphragm and gasket which also incorporates a one-way valve.

FIG. 4 shows gasket 11D. FIG. 4 also shows the upper diaphragm 11 and its sealing bead 11A. Sealing bead 11E circumferentially seals gasket 11D. Sealing bead 21A circumferentially seals flapper valve 21. Sealing bead 24C circumferentially seals hole 11C.

Figure 5:
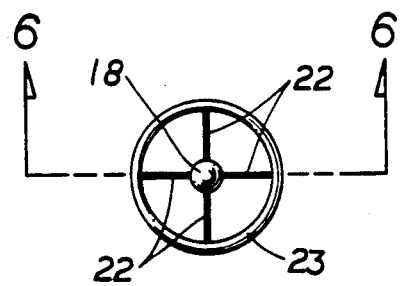
FIG. 5 shows the construction of the solenoid circuit flow control ball assembly.

FIG. 5 shows a low cost molded plastic ball 18 supported by radial spokes 22 in the center of circular ring seal 23. Radial spokes 22 create a suitable bias to keep the ball 18 normally blocking passage 17 (in the UP position in ball chamber 18A of FIG. 3, 7, and 8). Circular ring seal 23 is mounted horizontally and circumferentially in ball chamber 18A. The upward bias on ball 18 provided by radial spokes 22 prevents low pressure fluid flow through the solenoid circuit into passage 17 and then into the outlet port 5. When electrical current is applied to solenoid 7 of FIG. 3, solenoid plunger 19 pushes ball 18 down and opens the valve allowing fluid to flow from inlet port 4 to outlet port 5.

Figure 6:
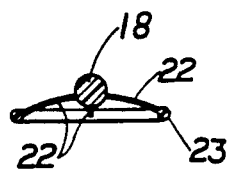
FIG. 6 shows a section view of the solenoid circuit flow control ball assembly of FIG. 5.

FIG. 6 shows that radial spokes 22 of circular ring seal 23 bias ball 18 above the plane defined by the circumference of ring seal 23. Thus, the bias created by the spokes 22 maintains ball 18 in the UP (or valve OFF) position in ball chamber 18A which blocks passage 17 and thereby prevents the flow of fluid to fluid outlet port 5.

Figure 6A:
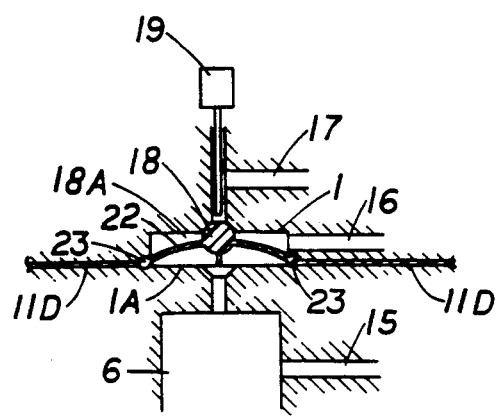
FIG. 6A shows a cross-section of the solenoid circuit flow control ball assembly mounted in the ball chamber.

FIG. 6A shows a cross-section of the ball 18 of FIG. 5 mounted in ball chamber 18A. FIG. 6A also shows upper body 1, lower body 1A, sediment sump 6, gasket 11D, passage 15, circular ring seal 23, radial spokes 22, passage 17, and solenoid plunger 19. FIG. 6A shows the upward bias on radial spokes 22 of ring seal 23 which keeps ball 18 blocking passage 17 when electrical current is not applied to the solenoid.

Figure 7:
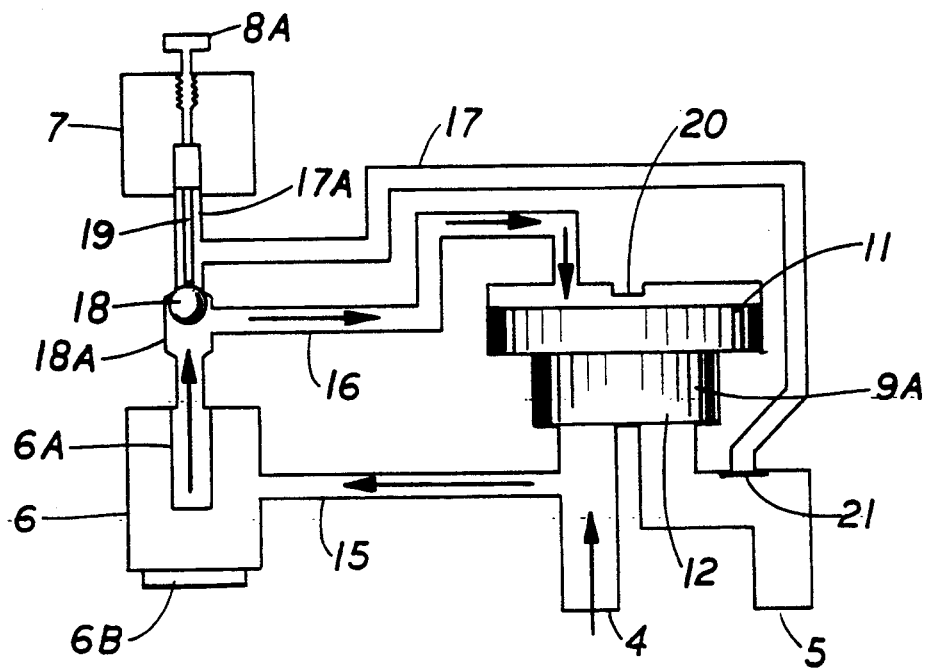
FIG. 7 is a schematic diagram of the sprinkler valve in the "OFF" state.
Figure 8:
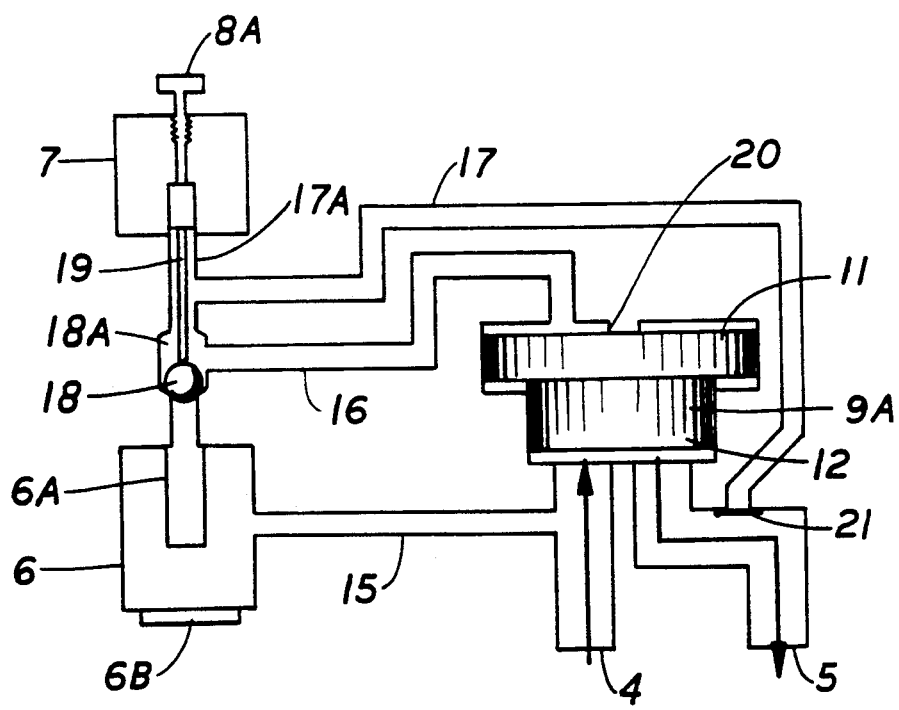
FIG. 8 is a schematic diagram showing the sprinkler valve in a steady state flow condition or "ON" state.

FIGS. 7 and 8 will be used to describe the operation of the valve. FIGS. 7 and 8 represent function and not necessarily the low cost construction of an actual valve. The double diaphragm assembly employed in the design in FIGS. 1, 2, and 3 has been changed to a double piston to facilitate the description of how the valve operates.

Obviously, for one skilled in the art, a stepped piston can also be used by utilizing piston seals and a small bias spring which bias spring is equivalent to the bias provided by the downward cupping of diaphragm assembly 9A described above in conjunction with FIG. 2.

In the discussion of the valve's operation in conjunction with FIGS. 7 and 8 below, assume that the inlet pressure at inlet port 4 is normally in the range of 40 psi to 150 psi and that the pressure drop from inlet port 4 to outlet port 5 is minimal due to the construction of the ports and internal chambers.

The following description covers the normal operating condition in which the fluid pressure at inlet port 4 is equal to or greater than the fluid pressure at outlet port 5.

FIG. 7 shows the valve in the OFF position with ball 18 in the UP position in ball chamber 18A. FIG. 7 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 7 also shows piston assembly 9A (functionally equivalent to diaphragm assembly 9A of FIG. 2). FIG. 7 also shows flapper valve 21, passage 15 which connects inlet port 4 to sediment sump 6, passage 16 which connects ball chamber 18A to the top of piston 11, passage 17 which connects ball chamber 18A to outlet port 5, and narrow portion 17A of ball chamber 18A. FIG. 7 also shows the electrically controlled solenoid plunger 19 which pushes ball 18 down to prevent fluid from entering chamber 18A. FIG. 7 also shows stop 20 (functionally equivalent to stop 13A of FIG. 2) which prevents the top of piston 11 from blocking passage 16.

In FIG. 7, the small area of the piston 12 has closed off the inlet port 4 and outlet port 5. This closing is accomplished by the fluid pressure from passage 15 which fluid exerts pressure on ball 18 located in ball chamber 18A. This fluid pressure forces ball 18 to the top of ball chamber 18A and blocks passage 17. This pressure is passed on from passage 16 to the upper larger area 11 of the piston. In FIG. 7, ports 4 and 5 will be closed because the area of piston 11 is larger than the area of piston 12.

To open the valve, as shown in FIG. 8, electrical current is applied to the solenoid coil 7 causing the plunger 19 to push the ball 18 downward in chamber 18A to block the flow of fluid from passage 15 and sump 6 from entering passage 16.

FIG. 8 shows the valve in the ON position with ball 18 in the DOWN position in ball chamber 18A.

FIG. 8 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 7 also shows piston assembly 9A (functionally equivalent to diaphragm assembly 9A of FIG. 2). FIG. 7 also shows flapper valve 21, passage 15 which connects inlet port 4 to sediment sump 6, passage 16 which connects ball chamber 18A to the top of piston 11, passage 17 which connects ball chamber 18A to outlet port 5, and narrow portion 17A of ball chamber 18A. FIG. 7 also shows the electrically controlled solenoid plunger 19 which pushes ball 18 down to prevent fluid from entering chamber 18A. FIG. 7 also shows stop 20 (functionally equivalent to stop 13A of FIG. 2) which prevents the top of piston 11 from blocking passage 16.

FIG. 8 shows passage 16 connected to passage 17 which connection allows the fluid pressing on the upper area 11 of the piston to flow into passage 17 thus reducing the pressure on upper area 11 of the piston and thereby allowing the pressure exerted at inlet port 4 and transmitted to bottom area 12 of the piston to open the direct passage from inlet port 4 to outlet port 5.

Flapper valve 21 prevents fluid backup to upper area 11 of the piston (through passages 16 and 17) which backup could cause the valve to switch to the OFF position. This switching to the OFF state would occur (in the absence of the flapper valve) when the flow rate in a drip system is low enough to build sufficient back pressure to cause fluid flow back through the solenoid circuit.

The foregoing sets forth only one embodiment of the sprinkler valve.

It is to be understood that while the various aspects of the invention have been described above with respect to their preferred embodiments other embodiments within the scope and spirit of this invention are possible.

For example, the sprinkler valve could be used with fluids other than water and for applications other than sprinkling a lawn with water. The sprinkler valve may be used in any application in which a low fluid flow rate and low fluid pressure are desired along with the ability to operate the valve with substantially higher flow rates and pressures. The fluid involved may be a liquid or a gas.

For example, the invention could be made without a gasket using only "O" ring seals where appropriate to seal between the upper body half and the lower body half.

By way of further example, neither diaphragm need be part of a gasket.

The description and examples are intended to illustrate and not limit the scope of the invention which is defined by the full scope of the appended claims and which invention is entitled to protection within the full scope of the appended claims.

What is claimed is:

1. A sprinkler valve for controlling fluid flow comprising:
   a shell,
   a plurality of chambers in the shell,
   an inlet port,
   an outlet port,
   an upper diaphragm and a lower diaphragm,
   a passageway connecting the inlet port to the bottom of the lower diaphragm,
   a plurality of passageways connecting the inlet port to the top of the upper diaphragm and
   the top of the upper diaphragm to the outlet port,
   a passageway connecting the bottom of the lower diaphragm to the outlet port,
   a solenoid operably connected to a fluid flow blocking means which fluid flow blocking means in a first position blocks fluid flow from the top of the upper diaphragm to the outlet port and which fluid flow blocking means in a second position blocks fluid flow from the inlet port to the top of the upper diaphragm,
   a means for activating the sprinkler valve without connecting electrical current to the solenoid,
   a means for preventing fluid from flowing from the outlet port into the first of the plurality of passageways connecting the outlet port to the top of the upper diaphragm and for preventing fluid pressure at the outlet port from being applied to the top of the upper diaphragm, and a means for allowing only momentary fluid flow from on top of the upper diaphragm toward the outlet port.

2. A sprinkler valve as in claim 1 wherein the means for allowing only momentary fluid flow from on top of the upper diaphragm toward the outlet port includes a solenoid connected to a solenoid plunger which solenoid plunger pushes the fluid flow blocking means from the first position to the second position when an electrical current is applied to the solenoid and which movement of the fluid flow blocking means causes a momentary flow of fluid from on top of the upper diaphragm toward the outlet port.

3. A sprinkler valve as in claim 1 in which the plurality of chambers includes a ball chamber and a diaphragm assembly chamber.

4. A sprinkler valve as in claim 1 which also includes a means to prevent fluid from flowing from the outlet port back through the sprinkler valve and into the inlet port and then out to a fluid source.

5. A sprinkler valve as in claim 1 in which the plurality of chamber includes an anti-siphon valve chamber.

6. A sprinkler valve as in claim 4 in which the means to prevent fluid from flowing from the outlet port back through the sprinkler valve and into the inlet port and then out to a fluid source includes an anti-siphon valve.

7. A sprinkler valve as in claim 1 in which the plurality of chambers includes a diaphragm assembly chamber in which is located a diaphragm assembly which diaphragm assembly comprises a circular support ring in which are concentrically mounted a spool, a stop on top of the spool, an upper circular diaphragm beneath the stop and around the upper portion of the spool, and a lower circular diaphragm beneath the upper circular diaphragm and around the spool, and in which the surface area of the upper circular diaphragm is greater than the surface area of the lower circular diaphragm.

8. A sprinkler valve as in claim 2 in which the means for activating the sprinkler valve without connecting electrical current to the solenoid is an external thread on the solenoid which allows the solenoid to be screwed down which downward motion of the solenoid moves the fluid flow blocking means from the first position to the second position which opens the sprinkler valve.

9. A sprinkler valve as in claim 1 in which the means for preventing fluid from flowing from the outlet port into the first of the plurality of passageways connecting the outlet port to the top of the upper diaphragm includes a flapper valve attached to the sprinkler valve in such a manner that fluid flow from the outlet port of the sprinkler valve in the direction of the top of the upper diaphragm closes the flapper valve and stops fluid from flowing from the outlet port into the first of the plurality of passageways from the outlet port to the top of the upper diaphragm and which flapper valve is attached to the sprinkler valve in such a manner that fluid pressure at the outlet port is not applied to the top of the upper diaphragm.

10. A sprinkler valve as in claim 4 in which the means for preventing fluid from flowing from the outlet port into the first of the plurality of passageways connecting the outlet port to the top of the upper diaphragm and for preventing fluid pressure at the outlet port from being applied to the top of the upper diaphragm and the means to prevent fluid from flowing from the outlet port back through the sprinkler valve and into the inlet port and then out to a fluid source includes a flapper valve.

11. A sprinkler valve as in claim 1 in which the plurality of chambers includes a sediment sump.

12. A sprinkler valve as in claim 1 in which the shell comprises a lower body shell secured to an upper body shell which together form a single shell.

13. A diaphragm assembly for use in a sprinkler valve with an inlet port, an outlet port, a flapper valve, a ball in a ball chamber, a solenoid connected to a solenoid plunger which solenoid plunger may contact the ball in the ball chamber, a passageway connecting the outlet port to the ball chamber, a passageway connecting the inlet port to the ball chamber, and a passageway connecting a top surface of an upper circular diaphragm of the diaphragm assembly to the ball chamber which diaphragm assembly comprises a circular support ring in which are concentrically mounted a spool, a stop on top of the spool, an upper circular diaphragm beneath the stop and around the spool, and a lower circular diaphragm beneath the upper circular diaphragm and around the spool, and in which the surface area of the upper circular diaphragm is greater than the surface area of the lower circular diaphragm and in which sprinkler valve the flapper valve is attached in such a manner that fluid flow from the outlet port of the sprinkler valve in the direction of the ball chamber closes the flapper valve and stops fluid from flowing from the outlet port to the passageway from the outlet port to the ball chamber and which flapper valve is attached in such a manner that fluid pressure at the outlet port is not applied to the top of the upper diaphragm and which sprinkler valve is controlled by application of fluid pressure at the inlet port of the valve to the diaphragms.

14. A diaphragm assembly for use in a sprinkler valve with an inlet port, an outlet port, a flapper valve, a ball in a ball chamber, a solenoid connected to a solenoid plunger which solenoid plunger may contact the ball in the ball chamber, a gasket, a passageway connecting the outlet port to the ball chamber, a passageway connecting the inlet port to the ball chamber, and a passageway connecting a top surface of an upper circular diaphragm of the diaphragm assembly to the ball chamber which diaphragm assembly comprises a circular support ring in which are concentrically mounted a spool, a stop on top of the spool, the upper circular diaphragm beneath the stop and around the spool, and a lower circular diaphragm beneath the upper circular diaphragm and around the spool, and in which the surface area of the upper circular diaphragm is greater than the surface area of the lower circular diaphragm and in which sprinkler valve the upper diaphragm is part of the gasket and in which sprinkler valve the flapper valve is located in such a manner that fluid flow from the outlet port of the sprinkler valve in the direction of the ball chamber closes the flapper valve and stops fluid from flowing from the outlet port to the passageway from the outlet port to the ball chamber and which flapper valve is located in such a manner that fluid pressure at the outlet port is not applied to the top of the upper diaphragm and which sprinkler valve is controlled by application of fluid pressure at the inlet port of the valve to the diaphragms.

* * * * *